(12) United States Patent
Higginbotham et al.

(10) Patent No.: US 7,581,405 B2
(45) Date of Patent: Sep. 1, 2009

(54) STORAGE VESSEL FOR CRYOGENIC LIQUID

(75) Inventors: Paul Higginbotham, Guildford (GB); Kelvin Graham Hayes, East Horsley (GB); Declan Patrick O'Connor, Chessington (GB)

(73) Assignee: Air Products and Chemicals, Inc., Allentown, PA (US)

( * ) Notice: Subject to any disclaimer, the term of this patent is extended or adjusted under 35 U.S.C. 154(b) by 450 days.

(21) Appl. No.: 11/516,220

(22) Filed: Sep. 6, 2006

(65) Prior Publication Data
US 2007/0068177 A1    Mar. 29, 2007

(30) Foreign Application Priority Data
Sep. 29, 2005    (GB)    .................. 0519886.6

(51) Int. Cl.
*F17C 5/02*    (2006.01)
*F17C 3/10*    (2006.01)
(52) U.S. Cl. ......................................... 62/47.1; 62/48.2
(58) Field of Classification Search ................. 62/47.1, 62/48.2
See application file for complete search history.

(56) References Cited

U.S. PATENT DOCUMENTS

| | | | | |
|---|---|---|---|---|
| 2,059,942 A * | 11/1936 | Gibson | ........................... | 62/98 |
| 2,784,560 A | 3/1957 | Johnson, Jr. | | |
| 2,938,360 A | 5/1960 | Christensen | | |
| 2,944,405 A | 7/1960 | Basore et al. | | |
| 3,098,362 A * | 7/1963 | Sohda et al. | ................... | 62/48.2 |
| 3,108,447 A * | 10/1963 | Maher et al. | ................... | 62/47.1 |
| 3,191,394 A * | 6/1965 | Avery et al. | .................... | 62/47.1 |
| 3,453,836 A * | 7/1969 | Kerr | ............................ | 62/47.1 |
| 3,857,251 A * | 12/1974 | Alleaume | ..................... | 62/623 |
| 3,894,856 A | 7/1975 | Lofredo et al. | | |
| 4,551,981 A | 11/1985 | Banerjee | | |
| 5,327,729 A | 7/1994 | Yanai et al. | | |
| 5,590,535 A | 1/1997 | Rhoades | | |
| 6,470,706 B1 | 10/2002 | Engdahl | | |
| 6,786,063 B2 * | 9/2004 | Halse | ........................... | 62/611 |
| 7,299,655 B2 * | 11/2007 | Ward | ............................ | 62/614 |

FOREIGN PATENT DOCUMENTS

| | | |
|---|---|---|
| EP | 0744577 B1 | 3/2004 |
| FR | 2 165 729 A1 | 8/1973 |
| FR | 2 406 782 A1 | 5/1979 |
| SU | 842329 | 6/1981 |
| SU | 1631224 | 2/1991 |
| TW | 229814 | 9/1994 |

\* cited by examiner

*Primary Examiner*—William C Doerrler
(74) *Attorney, Agent, or Firm*—Willard Jones; Eric J. Schaal

(57) ABSTRACT

A storage vessel comprises a condenser for condensing boil-off vapor by direct heat exchange with cryogenic liquid feed to the vessel. The condenser comprises a packed arrangement of vapor-liquid contact packing that comprises a top end portion and a bottom end portion. At least said top end portion is open to the vapor space to allow entry of boil-off vapor into the arrangement. The bottom end portion is in fluid flow communication with the lower portion of the storage vessel. One advantage of the invention is that the condenser is open to the vapor space of the storage vessel thereby allowing boil-off vapor to be drawn into the condenser by the condensation action of the vapor.

13 Claims, 2 Drawing Sheets

STORAGE VESSEL FOR CRYOGENIC LIQUID

TECHNICAL FIELD OF THE INVENTION

The present invention relates to a storage vessel for cryogenic liquid and has particular application in both land-based and ship-board storage vessels.

BACKGROUND OF THE INVENTION

Cryogenic liquids, such as liquefied natural gas ("LNG"), liquid argon ("LAR"), liquid nitrogen ("LIN"), liquid oxygen ("LOX") or liquid hydrogen, are stored in insulated storage vessels to minimise the loss of liquid by vaporization. However, despite the insulation, some of the stored cryogenic liquid will inevitably vaporize due to heat leaking into the vessel (and the associated piping), pump work into re-circulating liquid streams and flash vaporization from liquid feeds, etc. Steps must therefore be taken to avoid a dangerous build-up of pressure in the storage vessel.

It is often preferable economically to use very large, low pressure storage vessels to store cryogenic liquid. For example, currently, the largest storage vessels for LOX or LIN have a capacity of about 5000 $m^3$ and the largest storage vessels for LNG (usually found on ships in groups of up to 5 storage vessels) each have a capacity of about 40,000 $m^3$. The scale of the problem of pressure build-up due to boil-off is relative to the size of the storage vessel.

It would be possible to simply vent the boil-off vapor to the atmosphere. However, such a solution is not desirable as it would be very costly in terms of wasted cryogenic liquid (which is expensive to produce) and, if the vapor is inflammable (e.g. natural gas or hydrogen), might result in a potentially dangerous build-up of vapor, particularly where very large storage vessels are used.

Another solution to combat boil-off from the storage vessel is to sub-cool sufficiently the liquid feed to the storage vessel to re-condense the boil-off vapor. However, unless the sub-cooled feed is brought into good mass and energy contact with generated vapor, equilibrium will not be achieved. Without equilibrium, either much of the vapor would still have to be vented or the amount of sub-cooling would have to be increased to increase the driving force for the vapor condensation.

To sub-cool the liquid feed by more than the minimum amount required to re-condense the boil-off vapor would result in additional energy consumption. The "excess" sub-cooling will generally result in the sub-cooled (and therefore denser) feed liquid sinking to the bottom of the storage and forming a lower stratified cold liquid zone.

To provide the required close thermal contact between the sub-cooled feed and the boil-off vapor, it is known to spray the sub-cooled liquid feed in the vapor space of the storage vessel. Such a spray technique is carried out to collapse the pressure of returning cryogenic liquid road trailers when being re-filled. However, spray techniques such as these are not very practical for very large storage vessels and are less effective when the storage level is high due the shorter contact time between the liquid and the boil-off vapor. In addition, spray (or "sparge") devices generally require an increase in the liquid feed pressure due to the pressure drop of the device and this increased supply pressure might not be available.

There are other techniques for condensing boil-off vapor known in the art. For example, U.S. Pat. No. 3,894,856 (Lofredo et al; published 15 Jul. 1975) discloses a process for purifying and liquefying natural gas. One of the objectives of the process is to maintain a constant composition of liquefied natural gas ("LNG") in a storage tank by liquefying vapors which are generated in the tank. In the exemplified embodiment, LNG boil-off vapor from the storage tank is condensed outside the tank by indirect heat exchange against LIN. The condensed vapor is then returned to the storage tank thereby maintaining the composition of the LNG in the tank.

U.S. Pat. No. 6,470,706 (Engdahl; published 29 Oct. 2002) discloses a boil-off vapor condenser in which boil-off vapor is condensed by direct heat exchange against a liquefied gas. It is disclosed that the condenser has particular application in storage and distribution systems for LNG. In these systems, the LNG is stored in a storage tank. Boil-off LNG vapor is fed to a vapor condenser provided outside the storage tank where it is condensed by direct heat and mass transfer with LNG pumped from the storage tank. Heat and mass transfer may be provided using random packing (such as 2 inch (5 cm) Pall rings), structured packing, tray columns or spray elements. The condensed LNG vapor is then fed to high pressure pumps, from which it is then routed to a distribution pipeline.

It is desirable to have a method of utilizing the refrigeration of a sub-cooled liquid feed to reduce boil-off in a compact device that will not significantly increase the required supply pressure of the liquid feed. It is particularly desirable that the method be suitable for use in very large low pressure storage vessels.

It is an object of preferred embodiments of the present invention to provide a storage vessel for cryogenic liquid in which at least some vapor piping is eliminated thereby reducing the cost and complexity of the storage vessel.

It is a further object of preferred embodiments of the present invention to provide a storage vessel for cryogenic liquid in which a boil-off vapor condenser does not require a leak tight enclosure.

It is a still further object of preferred embodiments of the present invention to provide a storage vessel for cryogenic liquid that does not require the use of an external refrigerant to provide refrigeration duty to condense boil-off vapor.

SUMMARY OF THE INVENTION

According to a first aspect of the present invention, there is provided a storage vessel for cryogenic liquid having a lower portion for storing said cryogenic liquid and a vapor space provided thereabove, said vessel having:

a condenser for condensing boil-off vapor by direct heat exchange with cryogenic liquid feed to the vessel, said condenser comprising a packed arrangement of vapor-liquid contact packing, said arrangement comprising a top end portion and a bottom end portion, wherein at least said top end portion is open to the vapor space to allow entry of boil-off vapor into the arrangement and said bottom end portion is in fluid flow communication with the lower portion of the storage vessel;

an inlet for providing cryogenic liquid feed to the top end portion of the packed arrangement of vapor-liquid contact packing; and an outlet for removing cryogenic liquid from the lower portion of the vessel.

According to a second aspect of the present invention, there is provided a process for condensing boil-off vapor in a cryogenic liquid storage vessel, said vessel having a lower portion for storing said cryogenic liquid, a vapor space provided thereabove and a condenser for condensing boil-off vapor by direct heat exchange with cryogenic liquid feed to the vessel, said condenser comprising vapor-liquid contact packing, said process comprising:

sub-cooling cryogenic liquid to produce sub-cooled cryogenic liquid; and feeding sub-cooled cryogenic liquid to the vapor-liquid contact packing of the condenser, whereby boil-off vapor from the vapor space of the vessel condenses in the packing of the condenser by direct heat exchange with said cryogenic liquid feed.

DETAILED DESCRIPTION OF THE INVENTION

Figure 1:
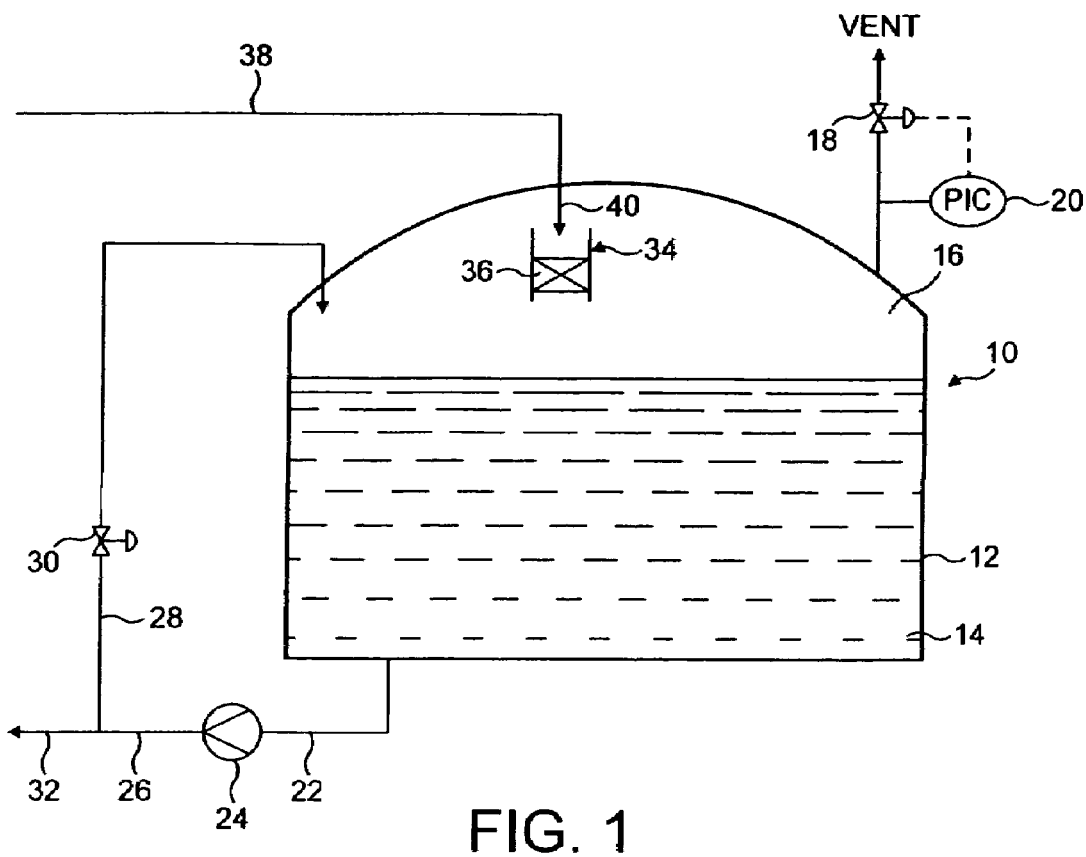
FIG. 1 is a schematic cross-sectional view of an embodiment of a storage vessel according to the present invention.

The storage vessel has a lower portion for storing cryogenic liquid and a vapor space provided thereabove. The vessel comprises a condenser for condensing boil-off vapor by direct heat exchange with cryogenic liquid feed to the vessel. The condenser comprises a packed arrangement of vapor-liquid contact packing. The packed arrangement comprises a top end portion and a bottom end portion and at least the top end portion is open to the vapor space to allow entry of boil-off vapor into the arrangement. The bottom end portion is in fluid flow communication with the lower portion of the storage vessel. The vessel also comprises an inlet for providing cryogenic liquid feed to the top end portion of the packed arrangement of vapor-liquid contact packing and an outlet for removing cryogenic liquid from the lower portion of the vessel.

Advantages arise due to the simplicity of the design of the condenser. For example, condensation of boil-off vapor occurs due to direct heat exchange between the cryogenic liquid feed and the boil-off vapor. Therefore, complex and expensive indirect heat exchangers are not required. In addition, the cryogenic liquid is drawn through the condenser by gravity thereby further simplifying the design. Further, the condensation action of boil-off vapor within the packed arrangement of vapor-liquid contact packing draws further boil-off vapor into the condenser. Therefore, there is no need to use piping or other equipment to feed boil-off vapor to the condenser as the condenser effectively feeds itself with boil-off vapor.

The top end portion of the packed arrangement of vapor-liquid contact packing will typically be colder than the bottom end portion as the sub-cooled liquid is fed to the top end portion and warms as it descends through the condenser. In use, the top end portion of the packed arrangement is colder than the bottom end portion. Thus, in embodiments where the bottom end portion of the packed arrangement is also open to the vapor space, more boil-off vapor will condense at the top end portion rather than at the bottom end portion thereby drawing more boil-off vapor into the condenser at the top rather than at the bottom.

The nature of the cryogenic liquid to be stored in the storage vessel is not critical to the invention. The invention is intended to have application in the storage of any cryogenic liquid including LNG, LAR, LIN, LOX and liquid hydrogen.

Storage vessels for cryogenic liquids usually have an enclosure wall, a base and a cover defining an interior that consists of a lower portion for receiving cryogenic liquid and a vapor space provided above said lower portion. Such vessels are usually insulated to reduce heat leak into the vessel as much as possible. However, no insulation is completely effective. Thus, such storage vessels will normally have a vent that may be opened and closed as required to release a build up of excess pressure due vaporization of cryogenic liquid caused by heat leaking into the storage vessel. The vent is usually controlled automatically using a pressure sensor to determine when the pressure exceeds a pre-determined safe limit and actuating means to operate the vent to release the excess pressure.

The source of the cryogenic liquid feed may be independent of the vessel or may be the vessel itself. In embodiments where the feed is independent of the vessel, the vessel may be integrated with a cryogenic air separation process in which the cryogenic liquid feed (e.g. LIN, LOX or LAR) may be produced in the cryogenic air separation process, sub-cooled as required and then fed to the vessel as the cryogenic liquid feed. Alternatively, the vessel may be integrated with a gas liquefaction process in which the cryogenic liquid feed (e.g. LNG or liquid hydrogen) may be produced in the liquefaction process, sub-cooled as required and then fed to the vessel as the cryogenic liquid feed. These embodiments are particularly suitable for static, land-based storage vessels.

In other embodiments, cryogenic liquid may be removed from the vessel, sub-cooled externally and then recycled back to the vessel as the cryogenic liquid feed. These embodiments are particularly applicable in transportation applications where boil-off must be suppressed but where there is no net feed to the storage vessel. An example of a suitable transportation application would be ship-board storage vessels for LNG.

The storage vessel may further comprise:

a pump for pumping cryogenic liquid;

conduit means for feeding cryogenic liquid from the storage vessel to the pump;

a heat exchanger for sub-cooling cryogenic liquid by indirect heat exchange against a refrigerant to produce sub-cooled cryogenic liquid;

conduit means for feeding pumped cryogenic liquid from the pump to the heat exchanger; and conduit means for feeding sub-cooled cryogenic liquid from the heat exchanger to the inlet of the storage vessel. These embodiments of the storage vessel may be integrated with a cryogenic air separation process or a liquefaction process. However, they have particular application for transporting cryogenic liquids, particularly by sea.

Any suitable refrigerant may be used and the conduit means are usually insulated piping.

The cryogenic liquid feed is typically sub-cooled to reduce the temperature to below that for the boil-off vapor thereby driving the condensation action. The feed is usually sub-cooled to at least the extent necessary to reduce or eliminate the need to vent boil-off vapor. Increasing the sub-cooling increasing the driving force for condensing the vapor and thus the surface area of the packing can be reduced proportionately.

The condenser may be mounted inside or outside the vessel. In embodiments in which the condenser is mounted outside the vessel, the condenser is contained within a container. The container has a top end portion and a bottom end portion, both of which are in fluid flow communication (e.g. via pipe work) with the vapor space of the vessel to allow entry of boil-off vapor into the packed arrangement of vapor-liquid contact packing and to allow condensed vapor (together with warmed cryogenic liquid) to be fed to the vapor space and, thus, to the lower portion of the vessel. Preferably, such a container and the associated pipe work are insulated to reduce heat leak into the condenser. If the condenser is outside the vessel, then it may be retro-fitted to an existing storage vessel.

In preferred embodiments, however, the condenser is mounted within the vapor space of the storage vessel. These embodiments have several advantages over the embodiments having external condensers. For example, by not having the condenser provided outside the vessel there is less opportunity for heat leaking into the vessel contributing to the boil-off problem. In addition, there is no need for the additional container, pipe work and extra insulation. Further, it is not necessary to enclose the condenser and, thus, vapor can enter the condenser from the side of the packing.

The packing material may be random packing such a Pall rings but is preferably structured packing such as corrugated, perforated metal sheets. The packing material preferably has a high surface area. The surface area of the packing is typically greater than 100 $m^2/m^3$ ($m^2$ surface area/$m^3$ packing volume), usually greater than 200 $m^2/m^3$ and preferably greater than 400 $m^2/m^3$. A suitable upper limit for the surface area of the packing is 750 $m^2/m^3$.

In embodiments where the packing is structured packing, the packing material may be banded together to form the packed arrangement in the form of a "plug". Where a plurality of corrugated, perforated metal sheets is used, the sheets are usually packed vertically in parallel. As there is negligible pressure drop between the packing vapor space and the storage vapor space, such a plug would not require a pressure enclosure and substantially all of the packed arrangement would be open to the vapor space to allow entry of boil-off vapor to the packing from substantially any direction.

However, in certain other preferred embodiments, the packed arrangement of vapor-liquid contact packing is contained within an enclosure. Random or structured packing may be used with an enclosure. Side portions of the packed arrangement may be closed to the vapor space if the enclosure does not have any apertures. However, preferably, at least a portion of the or at least one side of the packed arrangement is open to the vapor space though at least one aperture in the enclosure to allow entry of the vapor to the packing from the side.

In addition to the top end portion of the packed arrangement, the bottom end portion may also be open to the vapor space. These embodiments are particularly preferred when the condenser is within the vapor space of the storage vessel. The bottom end portion of the packed arrangement is in fluid flow communication with the lower portion of the vessel as condensed vapor (as a mixture with warmed feed) drops under gravity through the vapor space to the lower portion of the vessel.

However, in other embodiments, the storage vessel further comprises conduit means for feeding condensed vapor (as a mixture with warmed feed) from the bottom end portion of the packed arrangement to the lower portion of the storage vessel. Such conduit means may comprise a bottom enclosure (such as a bottom head), excluding vapor access from the vapor space to the bottom end portion of the packed arrangement, and piping to feed liquid collected in the bottom enclosure to the lower portion of the storage vessel.

Adequate distribution of the cryogenic liquid over the top portion of the packed arrangement may be achieved by simply disgorging the liquid feed on to the top portion of the packing and relying on the inherent spreading capability of the packing.

Alternatively, the vessel may further comprise a liquid distributor for distributing cryogenic liquid feed substantially uniformly over the top end portion of the packed arrangement of vapor-liquid contact packing. Any conventional liquid distributor may be used. The distributor may be pressurized (in which case it would be a closed distributor such as a pipe, sparge or spray distributor) or it may be unpressurized (in which case it could be an open distributor such as a plate or trough distributor). In preferred embodiments, the distributor is a plate distributor having vapor risers and a plurality of distribution apertures.

The storage vessel may have more than one condenser and/or more than one inlet feeding a single condenser. An inlet may split to feed more than one condenser. However, in preferred embodiments, the storage vessel has one condenser and one inlet for providing cryogenic liquid feed to said condenser.

The inlet for the condenser may be the only inlet to the vessel. However, in an alternative embodiment, at least one additional inlet may be included. The or each additional inlet does not usually feed a condenser and, instead, is usually located for feeding cryogenic liquid directly to the lower portion of the vessel through the vapor space. In some embodiments, the feed to the vessel is split into two portions. The first portion is sub-cooled and fed to the condenser and the second portion is not sub-cooled and instead fed directly to the liquid stored in the lower portion of the vessel. The reduction in flow of the sub-cooled portion means that the total surface area of the packing can be reduced.

The pressure in the vessel may be controlled by either varying the degree of sub-cooling of a single feed or the flow split between the sub-cooled and non sub-cooled feeds. Either option may be the primary pressure control system with a vent and pressure build-up vaporizer operating as a secondary system if the primary system is unable to keep the pressure within the desired range.

The condenser of the present invention has particular application to storage vessels having a very large capacity, i.e. a capacity of over 500 $m^3$. The upper limit of the capacity of storage vessels of the present invention may be as much as about 60,000 $m^3$, e.g. about 40,000 $m^3$ (particularly in respect of ship board storage vessels for LNG) or about 5,000 $m^3$ (particularly in respect of storage vessels for LOX or LIN).

The storage vessels of the present invention are preferably adapted for storage of low pressure cryogenic liquids, i.e. liquids having a pressure from about 0.5 bar vacuum (about 50 kPa absolute) to about 3 bar gauge (about 400 kPa absolute), preferably from about atmospheric pressure (about 100 kPa absolute) to about 0.5 bar gauge (about 150 kPa absolute).

The device is usually designed to condense the maximum vapor generation from the following sources:
  (a) heat leaking into the vessel and vaporizing part of the contents;
  (b) vapor displaced by filling the tank with liquid;
  (c) flash vapor from any part of the feed that is not sub-cooled; and
  (d) vapor generated by flash on pump recycle streams entering the tank.

The calculations for determining the amount of vapor produced by (a), (c) and (d) would be well known to the skilled person. The skilled person would also appreciate that the volumetric rate of vapor displaced by filling the vessel with liquid is equal to the volumetric rate of liquid feed to the vessel. Typically, heat leaking into the vessel through the insulation results in vaporization of about 0.2 to about 0.5% of the vessel's full content per day.

The total vapor generation is V (in kg/s). The duty Q (in kW) is equal to V.dH where dH is the latent heat of evaporation of the stored fluid (in kJ/kg). The required heat transfer surface area A (in m²) is calculated from the calculated duty Q, the heat transfer coefficient U (in kJ/m²/K) and the log mean temperature difference ("LMTD") between the condensing vapor and the liquid flowing over the surface according to the formula:

$$A = Q/(U \cdot LMTD)$$

The heat transfer coefficient can be estimated from relevant literature and the LMTD can be calculated from the sub-cooled liquid flow, the vapor flow and the liquid and vapor temperatures. A suitable margin can be applied to the required area A to give the actual area A*.

By designing the device for a close temperature approach of the liquid to the vapor (for example, less than 0.5K so that it is "pinched"), the duty for a fixed surface area can be made insensitive to the heat transfer coefficient so that its value does not have to be accurately estimated.

The volume of packing to be used, P (in m³), may then be given by P=A*/a where a is the surface area per unit volume of the packing (in m²/m³). The cross-sectional area of the device, X (in m²), should be determined using the design methods recommended for the chosen packing to ensure that vapor pressure drop is low and that the maximum vapor and liquid rates would not result in flooding of the packing if all the vapor entered at the bottom of the packing. Such a design method is well known in the art and will not be described further here. The packed height H (in m) may, thus, be given by H=P/X.

In embodiments employing a liquid distributor to distribute liquid feed substantially uniformly over the top end portion of the packed arrangement of the vapor-liquid contact packing, the liquid distributor should normally be sized so that the liquid flow over the packing is as uniform as possible. The design of such a distributor is well known and will not be described further here. There should be sufficient area for vapor flow round the liquid distributor to allow the maximum calculated vapor flow to enter the top of the device with a suitably low pressure drop.

In other embodiments, the liquid may be fed at a single point on top of the packing. In such embodiments, the effective surface area of the packing will need to be reduced to account for the surface that is not wetted by the liquid.

The process condenses boil-off vapor in a cryogenic liquid storage vessel having a lower portion for storing the cryogenic liquid, a vapor space provided thereabove and a condenser for condensing boil-off vapor by direct heat exchange with cryogenic liquid feed to the vessel. The condenser comprises vapor-liquid contact packing. The process comprises:

sub-cooling cryogenic liquid to produce sub-cooled cryogenic liquid; and feeding sub-cooled cryogenic liquid to the vapor-liquid contact packing of the condenser, whereby boil-off vapor from the vapor space of the vessel condenses in the packing of the condenser by direct heat exchange with said cryogenic liquid feed.

Preferably, the volume of the cryogenic liquid feed is sufficient to draw boil-off vapor into the packed arrangement of vapor-liquid contact packing.

The process preferably further comprises distributing said sub-cooled cryogenic liquid substantially uniformly over the top end portion of the packed arrangement of vapor-liquid contact packing.

The process may be integrated with a cryogenic air separation process producing the cryogenic liquid (e.g. LIN, LOX or LAR) or a liquefaction process producing the cryogenic liquid (e.g. LNG or liquid hydrogen). In other embodiments, the process may further comprise removing cryogenic liquid from the storage vessel, pumping said liquid and then sub-cooling the pumped liquid to produce said sub-cooled cryogenic liquid feed.

Particularly preferred embodiments of the storage vessel or the process according to the present invention are substantially as described herein with reference to the accompanying drawings.

The present invention will now be described by way of example only and with reference to the accompanying drawings.

FIG. 1 shows an storage vessel 10 for cryogenic liquid according to the present invention. The storage vessel could be used to contain any cryogenic fluid such as LNG, LIN, LAR, LOX, etc. The storage vessel is insulated but the insulation is not shown in the Figure.

The vessel 10 has a lower portion 12 for receiving the cryogenic liquid 14 and a vapor space 16 provided above the lower portion 12. A vent 18 is provided to release excess pressure build-up of boil-off vapor in the vapor space 16. Vent 18 is controlled by a pressure control device 20. A stream 22 of cryogenic liquid is removed from the vessel 10 and pumped to a higher pressure using pump 24 to produce a pumped stream 26 of cryogenic liquid. The pumped stream 26 is split into two portions. The first portion 28 is reduced in pressure across valve 30 and recycled to the vessel 10. The second portion 32 is removed as an outlet stream.

The storage vessel 10 is used to deliver cryogenic liquid continuously or intermittently to a downstream unit (not shown) or for export. There will generally one or more pumps/pump recycle lines 28 through which part of the pumped fluid is recycled for control. Any recycled liquid will generate additional boil-off due to the pump work and piping heat leak that increased the enthalpy of the recycled liquid.

Features 10 to 32 are generally well known in the art.

A condenser 34 is provided within the vapor space 16 of the vessel 10 and comprises a packed arrangement 36 of vapor-liquid contact packing. A stream 38 of cryogenic liquid feed is fed to the vessel 10 via inlet 40. Feed stream 38 has been sub-cooled (not shown) to at least the extent necessary to minimize or eliminate any boil-off vapor venting through the vent 18. Feed stream 38 is distributed substantially uniformly across the top end portion of the packed arrangement 36 of vapor-liquid contact packing using a liquid distributor (not shown). The sub-cooled liquid spreads over the packing to provide a large vapor-liquid interface surface area and condenses boil-off vapor. The condensed boil-off vapor (together with warmed feed liquid) drops from the condenser 34 into the stored liquid 14.

Condenser 34 is open to the vapor space 16 at both the top end portion and the bottom end portion. The condensation action of the vapor inside the condenser 34 draws boil-off vapor into the condenser at both the top and bottom end portions of the condenser. More vapor is drawn into the top end portion than at the bottom end portion as it is colder and thus more condensation takes place there. The top end portion is colder than the bottom end portion as the sub-cooled liquid is fed to this part of the condenser 34.

Figure 2:
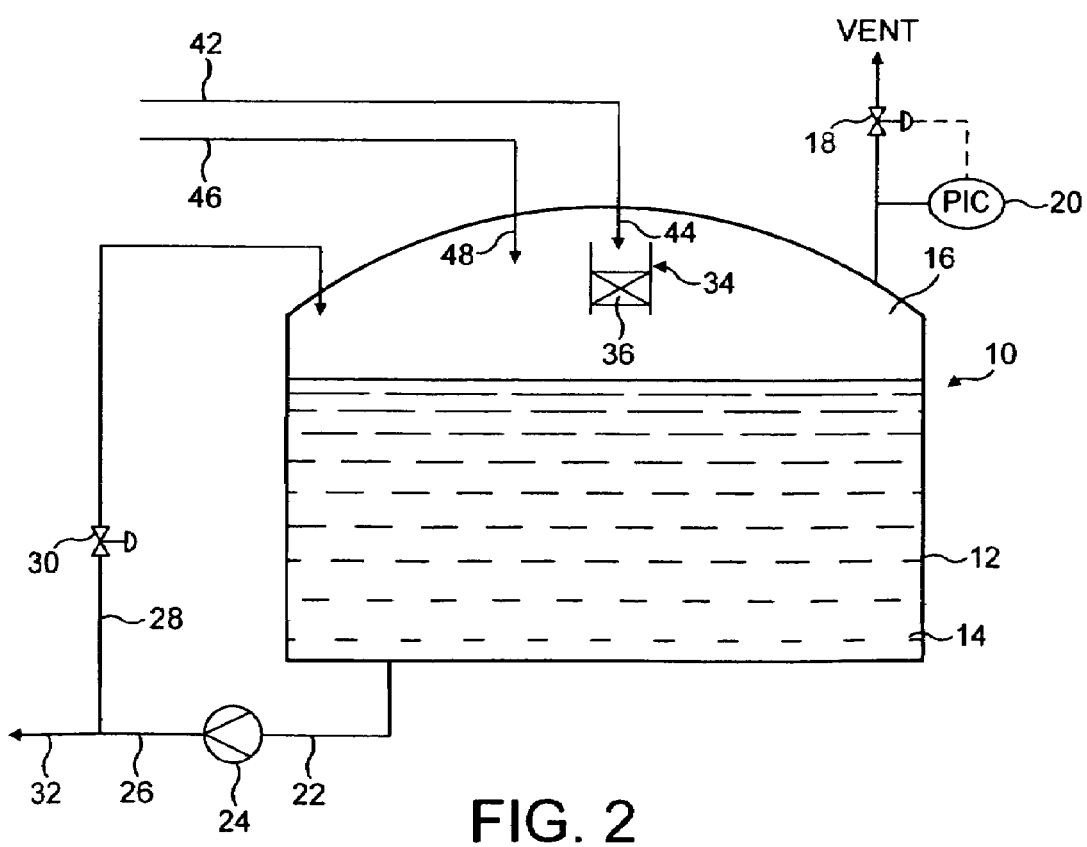
FIG. 2 is a schematic cross-sectional view of another embodiment of a storage vessel according to the present invention.

FIG. 2 depicts another embodiment of the storage vessel 10 of the present invention. Many of the features (10 to 36) of the vessel 10 depicted in FIG. 2 are the same as the features of the vessel 10 depicted in FIG. 1 and thus the same numerical legends have been used for the same features. The following is a discussion of the features of the vessel 10 in FIG. 2 that are different from the vessel 10 of FIG. 1.

Streams 42 and 46 of cryogenic liquid feed are both fed to the vessel 10 (respectively, through inlets 44 and 48). However, only stream 42 is sub-cooled (not shown) and, thus, only stream 42 is routed into the condenser 34. This embodiment might be used if there are actually two feed streams originating from separate locations. Alternatively, a single feed stream might be split into two parts and only one part might be sub-cooled. In this alternative embodiment, the sub-cooled part would have to be sub-cooled more deeply than is the case in FIG. 1. The increased sub-cooling would increase the driving force for condensing storage vapor and would therefore allow the surface area of the contact device to be lower. In addition, the reduced liquid flow through the device would also tend to reduce the cross-sectional area of the contact device. These advantages should be enough to justify the additional complexity of FIG. 2 as compared to FIG. 1

Figure 3:
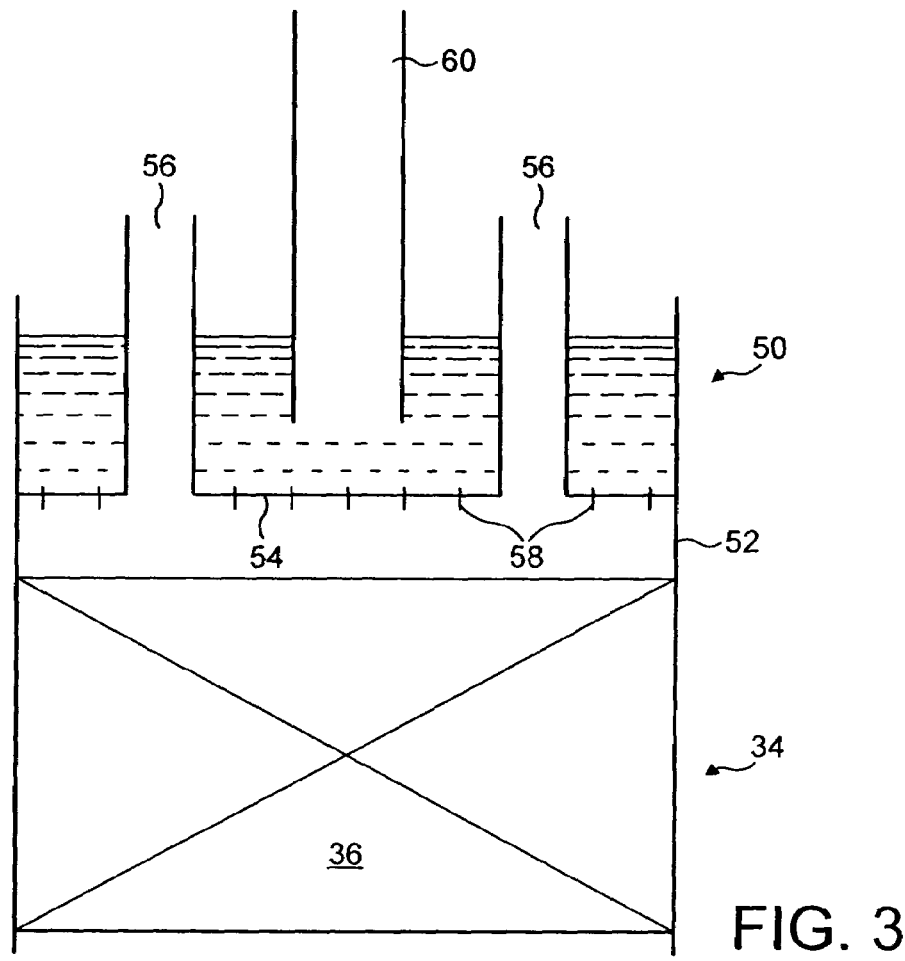
FIG. 3 is a schematic cross-sectional view of a condenser according to the present invention.

FIG. 3 depicts a liquid distributor 50 combined with the condenser 34 of FIG. 1 (or FIG. 2). The combination comprises an outside enclosure wall 52 and a liquid distributor plate 54 having vapor risers 56 and liquid distribution apertures 58. Below the liquid distributor 50 is a packed arrangement 36 of high surface area contact packing. The packed arrangement 36 will usually have a support system (not shown) provided underneath and possibly a hold-down system (not shown) provided above.

Figure 4:
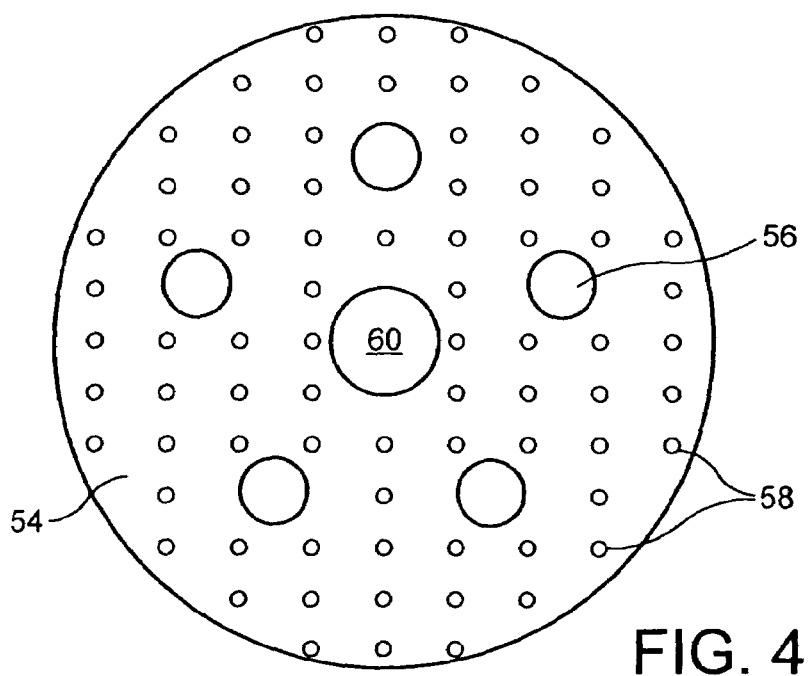
FIG. 4 is a plan view of the distributor plate 24 of the distributor depicted in FIG. 3.

FIG. 4 shows a plan view of the distributor plate 54 with the vapor risers 56 and the distribution apertures 58. Any known alternative type of liquid distribution method (such a trough distributor) can be used in place of the plate and riser type shown.

Sub-cooled liquid enters the distributor 50 via feed pipe 60 and is distributed substantially uniformly through apertures 58 on to the top end portion of the packed arrangement 36 of the packing material.

Boil-off vapor is free to enter the condenser 34 from above and from below as the top and bottom ends of the condenser are open to the vapor space. As the sub-cooled liquid feed enters from the top of the device, most vapor condensation will occur in the upper part of the packed arrangement as the temperature difference between the sub-cooled liquid and the saturated boil-off vapor will be higher there than lower down when the liquid has been warmed by condensation of vapor. Therefore, most of the vapor entering the condenser will tend to enter from the top. In the combination of FIG. 3, the top vapor travels downwards through the vapor risers 56. However, vapor also travels upwards into contact material, being "sucked" there by the condensation occurring in the packing.

As most vapor enters from above, hydraulic flooding of the condenser is not a concern. The condenser also compensates for liquid distribution being poorer than design as the vapor will be preferentially drawn to any points in the packing which are colder than average (which is what would happen if more than an average amount of liquid feed is fed to those points due to mal-distribution).

A liquid distributor of the type in FIG. 3 could flood due to blockage of some distribution apertures 58 or due to higher than design liquid feed flow. As the condenser is open to the vapor space at both ends, such flooding would only reduce the efficiency of the device rather than stop it working. Excess liquid would overflow the top of the enclosure wall 52 (which ideally should be a lower elevation than the top of the risers 56 so that vapor entry from above is not restricted).

It should be noted that it is the condensation of vapor inside the condenser which draws vapor into the condenser. Thus, condenser device can be located at any convenient location in the storage vapor space, i.e. it does not need to be located locally to where the vent line 18 is located.

Throughout the specification, the term "means" in the context of means for carrying out a particular function is intended to mean any suitable apparatus adapted or constructed to carry out that function.

It will be appreciated that the invention is not restricted to the details described above with reference to the preferred embodiments but that numerous modifications and variations can be made without departing from the spirit or scope of the invention as defined by the following claims.

The invention claimed is:

1. A storage vessel for cryogenic liquid having a lower portion for storing said cryogenic liquid and a vapor space provided thereabove, said vessel having:
   a condenser for condensing boil-off vapor by direct heat exchange with an external cryogenic liquid supply feed to the vessel, said condenser comprising a packed arrangement of vapor-liquid contact packing, said arrangement comprising a top end portion and a bottom end portion, wherein at least said top end portion is open to the vapor space to allow entry of boil-off vapor into the arrangement and said bottom end portion is in fluid flow communication with the lower portion of the storage vessel;
   an inlet for providing the external cryogenic liquid supply feed to the top end portion of the packed arrangement of vapor-liquid contact packing; and
   an outlet for removing cryogenic liquid from the lower portion of the vessel wherein substantially all of the refrigeration for condensing the boil-off vapor is supplied by the external cryogenic liquid supply feed to the vessel.

2. The storage vessel according to claim 1, wherein said condenser is mounted within the vapor space of the storage vessel.

3. The storage vessel according to claim 2, wherein said packing is structured packing and substantially all of the packed arrangement is open to the vapor space.

4. The storage vessel according to claim 1, wherein said packed arrangement of vapor-liquid contact packing is contained within an enclosure.

5. The storage vessel according to claim 4, wherein at least a portion of the or at least one side of the said packed arrangement is open to the vapor space through at least one aperture in the enclosure.

6. The storage vessel according to claim 1, wherein the bottom end portion of the packed arrangement is open to the vapor space.

7. The storage vessel according to claim 1, further comprising a liquid distributor for distributing the external cryogenic liquid supply feed substantially uniformly over the top end portion of the packed arrangement of vapor-liquid contact packing.

8. The storage vessel according to claim 1, further comprising one condenser and one inlet for providing the external cryogenic liquid supply feed to said condenser.

9. The storage vessel according to claim 1, wherein the storage vessel has a capacity greater than 500 m$^3$.

10. The storage vessel according to claim 1, wherein the storage vessel is adapted for storage of cryogenic liquid at a pressure from about 50 kPa absolute (about 0.5 bar vacuum) to about 400 kPa absolute (about 3 bar gauge).

11. A process for condensing boil-off vapor in a cryogenic liquid storage vessel, said vessel having a lower portion for storing said cryogenic liquid, a vapor space provided thereabove and a condenser for condensing boil-off vapor by direct heat exchange with an external cryogenic liquid supply feed to the vessel, said condenser comprising vapor-liquid contact packing, said process comprising:

sub-cooling the external cryogenic liquid supply feed to produce a sub-cooled cryogenic liquid; and feeding the sub-cooled cryogenic liquid to the vapor-liquid contact packing of the condenser, whereby boil-off vapor from the vapor space of the vessel condenses in the packing of the condenser by direct heat exchange with said sub-cooled cryogenic liquid and wherein substantially all of the refrigeration for condensing the boil-off vapor is supplied by the external cryogenic liquid supply feed to the vessel.

12. The process according to claim 11, wherein the volume of the external cryogenic liquid supply feed is sufficient to draw boil-off vapor into the packed arrangement of the vapor-liquid contact packing.

13. The process according to claim 11, further comprising distributing said sub-cooled cryogenic liquid substantially uniformly over the top end portion of the packed arrangement of the vapor-liquid contact packing.

* * * * *